United States Patent
Scheer et al.

(10) Patent No.: US 12,319,437 B2
(45) Date of Patent: Jun. 3, 2025

(54) DUAL-ROTOR SELF-LIFT POWER DRIVE UNIT

(71) Applicant: GOODRICH CORPORATION, Charlotte, NC (US)

(72) Inventors: Dustin P. Scheer, Jamestown, ND (US); Scott P. Harms, Ypsilanti, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 402 days.

(21) Appl. No.: 17/834,680

(22) Filed: Jun. 7, 2022

(65) Prior Publication Data

US 2023/0391452 A1    Dec. 7, 2023

(51) Int. Cl.
*B64D 9/00* (2006.01)
*B65G 13/06* (2006.01)

(52) U.S. Cl.
CPC ............. *B64D 9/00* (2013.01); *B65G 13/065* (2013.01); *B64D 2009/006* (2013.01)

(58) Field of Classification Search
CPC .. B64D 9/00; B64D 2009/006; B65G 13/065; H02K 1/18; H02K 7/083; H02K 7/085; H02K 7/086; H02K 16/02
See application file for complete search history.

(56) References Cited

U.S. PATENT DOCUMENTS

| | | | |
|---|---|---|---|
| 7,673,738 B2 | 3/2010 | McConnell | |
| 9,908,706 B1* | 3/2018 | Ribarov | B65G 13/06 |
| 2004/0074739 A1* | 4/2004 | Nguyen | B65G 39/09 |
| | | | 198/782 |
| 2007/0114861 A1* | 5/2007 | Bott | B65G 23/08 |
| | | | 310/156.19 |
| 2013/0181562 A1* | 7/2013 | Gieras | H02K 16/02 |
| | | | 310/114 |
| 2017/0129606 A1 | 5/2017 | Roberts | |
| 2018/0145557 A1* | 5/2018 | Hornischer | B60K 7/0007 |

OTHER PUBLICATIONS

Sinha, S., et al. "Design and performance of a single stator, dual rotor induction motor." 2007 7th International Conference on Power Electronics and Drive Systems, Nov. 27, 2007, https://doi.org/10.1109/peds.2007.4487852. (Year: 2007).*

* cited by examiner

*Primary Examiner* — Christopher D Hutchens
*Assistant Examiner* — Steven J Shur
(74) *Attorney, Agent, or Firm* — SNELL & WILMER L.L.P.

(57) ABSTRACT

A power drive unit for moving cargo relative to a cargo bay of an aircraft is disclosed herein. The power drive unit includes a lift cam coupled to camshaft, a drive wheel coupled to a drive shaft, and an induction motor having a first output shaft and a second output shaft, the first output shaft configured to drive the drive shaft and the second output shaft configured to drive the camshaft.

18 Claims, 9 Drawing Sheets

DUAL-ROTOR SELF-LIFT POWER DRIVE UNIT

FIELD

The present disclosure generally relates to power drive units and more specifically to self-lift power drive units.

BACKGROUND

Power drive units (PDUs) have wheels that are configured to move cargo along a conveyer plane and are used to load the cargo onto an aircraft. The PDU is generally configured to be raised and lowered with respect to the conveyer plane so that the wheels of the PDU can be engaged or disengaged depending on the position. Generally, two motors are used to in a PDU, one or raise and lower the PDU and the other to drive the wheels to move the cargo. Alternatively, a single motor may be used along with a sequence of gears and other components that allow the single motor to perform both the raise and lower function as a well as the drive function.

SUMMARY

A power drive unit for moving cargo relative to a cargo bay of an aircraft is disclosed herein. The power drive unit includes a lift cam coupled to camshaft, a drive wheel coupled to a drive shaft, and an induction motor having a first output shaft and a second output shaft, the first output shaft configured to drive the drive shaft and the second output shaft configured to drive the camshaft. In various embodiments, the induction motor further includes a first rotor, a second rotor, and a stator disposed around the first rotor and the second rotor. In various embodiments, the first rotor is coupled to the first output shaft and the second rotor is coupled to the second output shaft. In various embodiments, the first rotor has a first length and the second rotor has a second length, the second length being shorter than the first length.

In various embodiments, the induction motor further includes the first rotor including a first cast portion having a first side and an opposing second side, the first cast portion including a first rotor lamination and a first portion of the first output shaft, a second portion of the first output shaft extending out of the second side of the first cast portion. The induction motor further includes the second rotor including a second cast portion having a first side and an opposing second side, the second side of the second cast portion being adjacent the first side of the first cast portion, the second cast portion including a second rotor lamination and a first portion of the second output shaft, a second portion of the second output shaft extending out of the first side of the second cast portion. The induction motor further includes a first bearing disposed around the second portion of the first output shaft and a second bearing disposed around the second portion of the second output shaft.

In various embodiments, the induction motor further includes a third bearing disposed around a third portion of the second output shaft, the third portion of the second output shaft extending out of the second side of the second cast portion and into the first side of the first cast portion, the third bearing being within the first cast portion. In various embodiments, the induction motor further includes a third bearing disposed around the second portion of the first output shaft and adjacent the first bearing, the first bearing being disposed between the third bearing and the first cast portion and a fourth bearing disposed around the second portion of the second output shaft and adjacent the second bearing, the second bearing being disposed between the fourth bearing and the second cast portion.

In various embodiments, the power drive unit further includes a first gear coupled to the first output shaft and configured to drive the drive shaft and a second gear coupled to the second output shaft and configured to drive the camshaft, the second gear being operably independent from the first gear.

Also disclosed herein is an aircraft cargo system including a cargo bay having a conveyer plane and a power drive unit for moving cargo configured to raise and lower with respect to the conveyer plane. The power drive unit includes a camshaft, a drive shaft, and an induction motor having a first output shaft and a second output shaft, the first output shaft configured to drive the drive shaft and the second output shaft configured to drive the camshaft. In various embodiments, the induction motor further includes a first rotor electrically coupled to the stator and coupled to the first output shaft, a second rotor electrically coupled to the stator and coupled to the second output shaft, and a stator disposed around the first rotor and the second rotor.

In various embodiments, the first rotor has a first length and the second rotor has a second length, the second length being shorter than the first length. In various embodiments, the power drive unit further includes a wheel configured to move the cargo when the power drive unit is in a raised position, the wheel being coupled to the drive shaft and operable independent of the camshaft and a cam coupled to the camshaft and configured to raise and lower the power drive unit.

In various embodiments, the power drive unit further includes a first gear coupled to the first output shaft and configured to drive the drive shaft and a second gear coupled to the second output shaft and configured to drive the camshaft, the second gear being independent of the first gear. In various embodiments, the first rotor further includes a first cast portion, wherein a first portion the first output shaft is disposed inside the first cast portion and a second portion of the first output shaft is disposed outside of the first cast portion.

In various embodiments, the second rotor further includes a second cast portion, the second cast portion being laterally adjacent the first cast portion, wherein a first portion of the second output shaft is disposed within the second rotor inside the second cast portion and a second portion of the second output shaft is disposed outside of the second cast portion. In various embodiments, a third portion of the second output shaft is disposed outside of the second cast portion and inside of the first cast portion.

Also disclosed herein is a power drive unit, including a first gear assembly configured to drive a wheel, a second gear assembly configured to drive a camshaft, and an induction motor. The induction motor includes a first rotor including a first rotor cast portion coupled to a first output shaft, the first output shaft coupled to the first gear assembly, a second rotor including a second rotor cast portion coupled to a second output shaft, the second output shaft coupled to the second gear assembly and a stator. The stator is disposed around the first rotor cast portion and the second rotor cast portion.

In various embodiments, the power drive unit further includes a stop catch and a stop mechanism coupled to the second gear assembly and configured to contact the stop catch to stop the second gear assembly from rotating. In various embodiments, the second rotor is configured to stall when the stop mechanism contacts the stop catch. In various embodiments, the first rotor is configured to rotate while the second rotor is stalled. In various embodiments, the first gear assembly operates independently of the second gear assembly.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
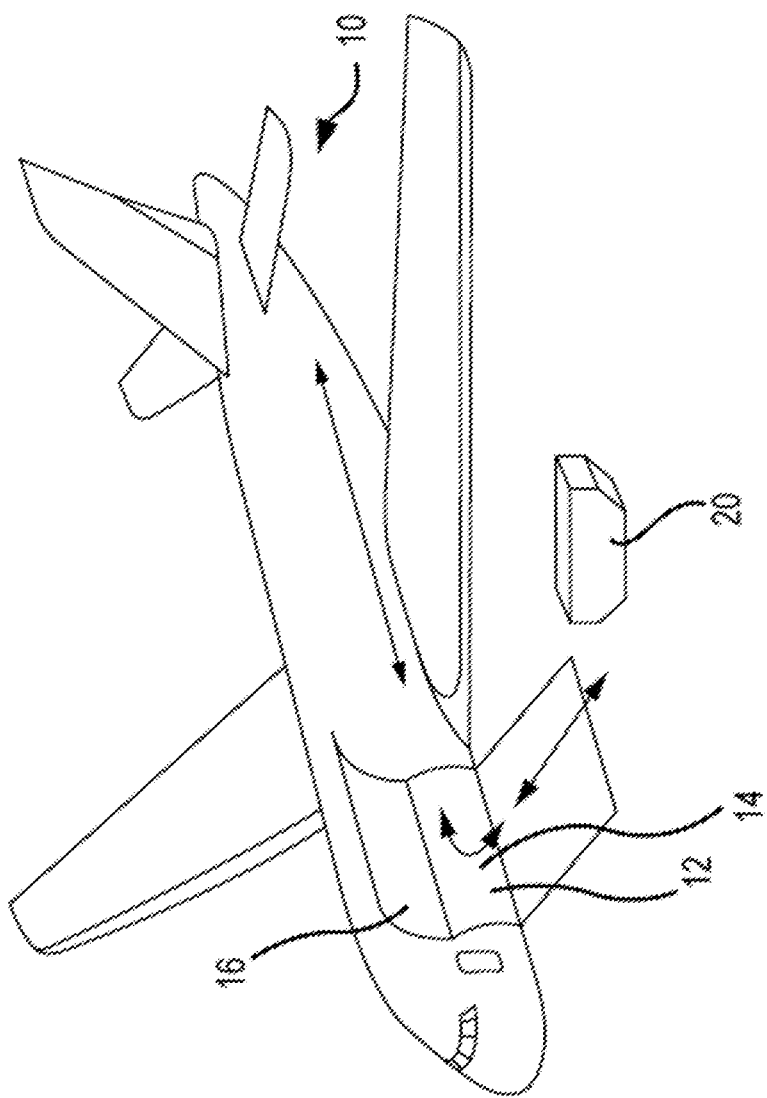
FIGS. 1A and 1B illustrate a schematic of an aircraft being loaded and a portion of a cargo handling system, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20, in the form of a container or pallet, for example, may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
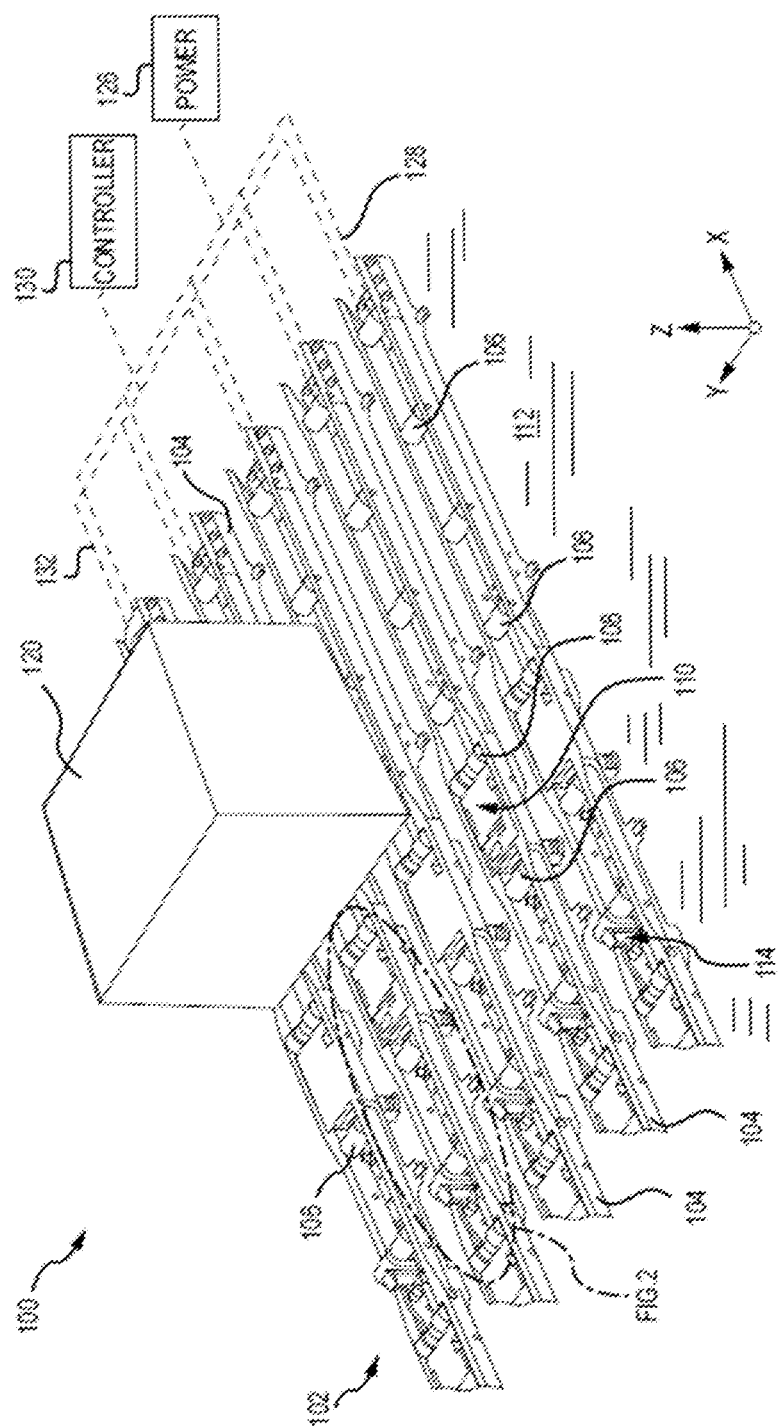

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive wheels or rollers 108 that may be actively powered by a motor. In various embodiments, one or more of the plurality of trays 104 is positioned longitudinally along the cargo deck 112— e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance surface 102 to an elevated position protruding above the conveyance surface 102 by the corresponding PDU. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs, which can also be used in various embodiments of the present disclosure, may include a drive roller that is held or biased in a position above the conveyance surface by a spring. PDUs as disclosed herein may be any type of electrically powered rollers that may be selectively energized to propel or drive the ULD 120 in a desired direction over the cargo deck 112 of the aircraft. The plurality of trays 104 may further support a plurality of restraint devices 114.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power busses 128. The system controller 130 may be complimented by or substituted with an agent-based control system, whereby control of each PDU and associated componentry—e.g., the restraint devices—is performed by individual unit controllers associated with each of the PDUs and configured to communicate between each other.

In various embodiments, PDUs 110 may be mounted in ball mats in the doorway of cargo compartment 14. When mounted in ball mats, PDUs 110 are generally mounted in pairs such that are orthogonal to one another. This allows a first PDU 110 to drive laterally (e.g., the y-direction) and a second PDU 110, mounted orthogonally to the first PDU 110, to drive longitudinally (e.g., the x-direction). There may be multiple pairs of orthogonally mounted PDUs 110 within a ball mat. Depending on which direction ULD 120 is moved, the first PDU 110, and corresponding laterally driving PDUs 110, may be raised or lowered. Similarly, the second PDU 110, and corresponding longitudinally driving PDUs 110, may be raised or lowered.

Figure 2:
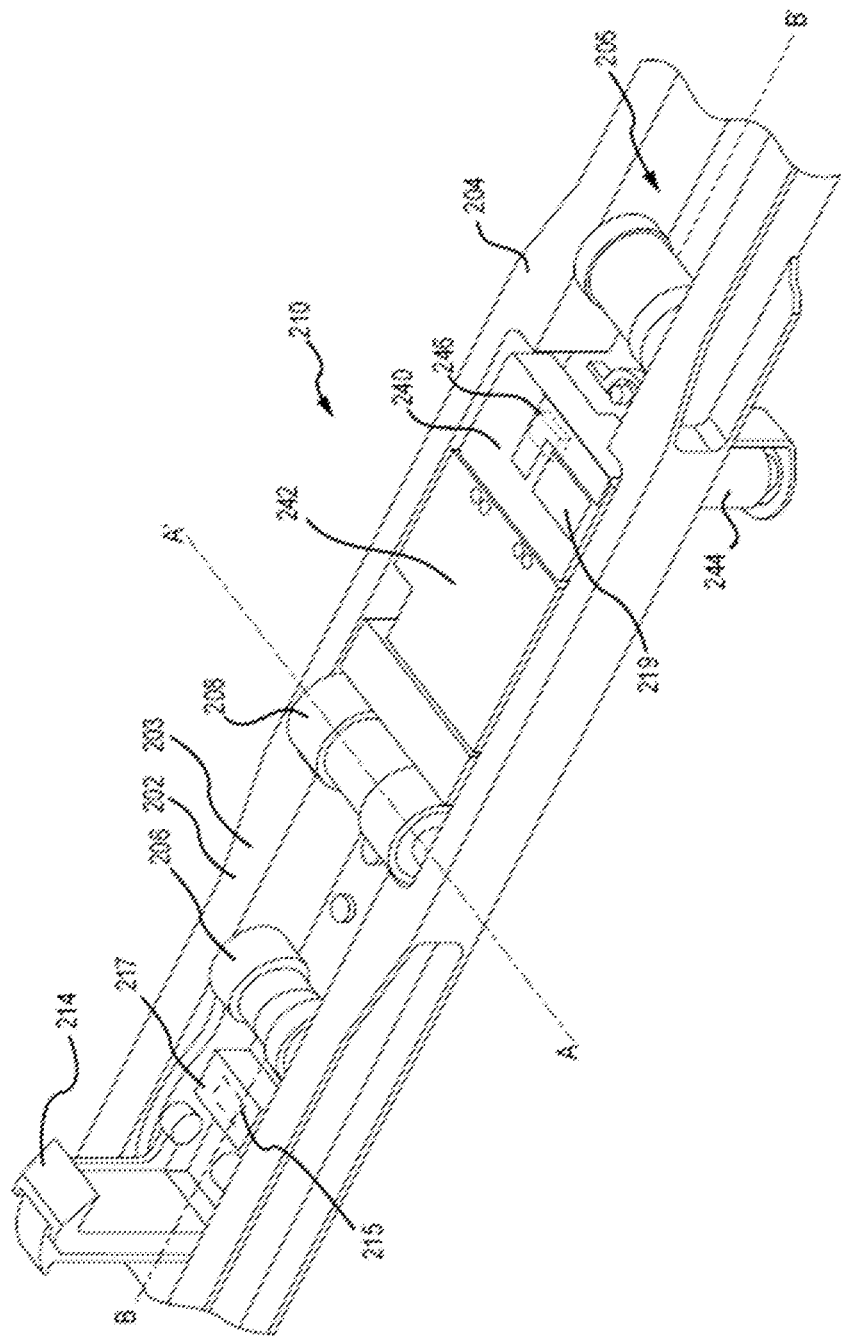
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. The PDU 210 may rotate the drive roller 208 in one of two possible directions (e.g., clockwise or counterclockwise) to propel the ULD in a direction parallel to the longitudinal axis B-B' of the tray 204. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic. In various embodiments, a connector 244 is used to couple the electronics of the PDU 210 to a power source and a system controller, such as, for example, the system controller 130 described above with reference to FIG. 1B. The connector 244 may have pins or slots and may be configured to couple to a wiring harness having pin programing. The unit controller 240 may be configured to receive commands from the system controller through the connector 244 in order to control operation of the unit motor 242.

In addition, a restraint device 214, such as, for example, one of the plurality of restraint devices 114 described above with reference to FIG. 1B, is illustrated as disposed within the tray 204 and configured to operate between a stowed position, whereby the ULD may pass over the restraint device, and a deployed position (as illustrated), whereby the ULD is restrained or prevented from translation in a longitudinal direction (e.g., along a longitudinal axis B-B') without the restraint device 214 first being returned to the stowed position. The restraint device 214 includes a restraint controller 215 and a restraint motor 217. In various embodiments, the restraint device 214 may be in mechanical communication with the restraint motor 217, which may be, for example, an electromagnetic, electromechanical or electrohydraulic actuator or other servomechanism. In various embodiments, the restraint controller 215 is configured to control operation of the restraint device 214. The restraint controller 215 may include a processor and a tangible, non-transitory memory. The processor may comprise one or more logic modules that implement logic to control operation of the restraint device 214 between the stowed and the deployed positions.

In various embodiments, the PDU 210 may also include a radio frequency identification device or RFID device 246, or similar device, configured to store, transmit or receive information or data—e.g., operational status or location data. Additionally, a ULD sensor 219 may be disposed within the tray 204 and configured to detect the presence of a ULD as the ULD is positioned over or proximate to the PDU 210 or the restraint device 214. In various embodiments, the ULD sensor 219 may include any type of sensor capable of detecting the presence of a ULD. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3A:
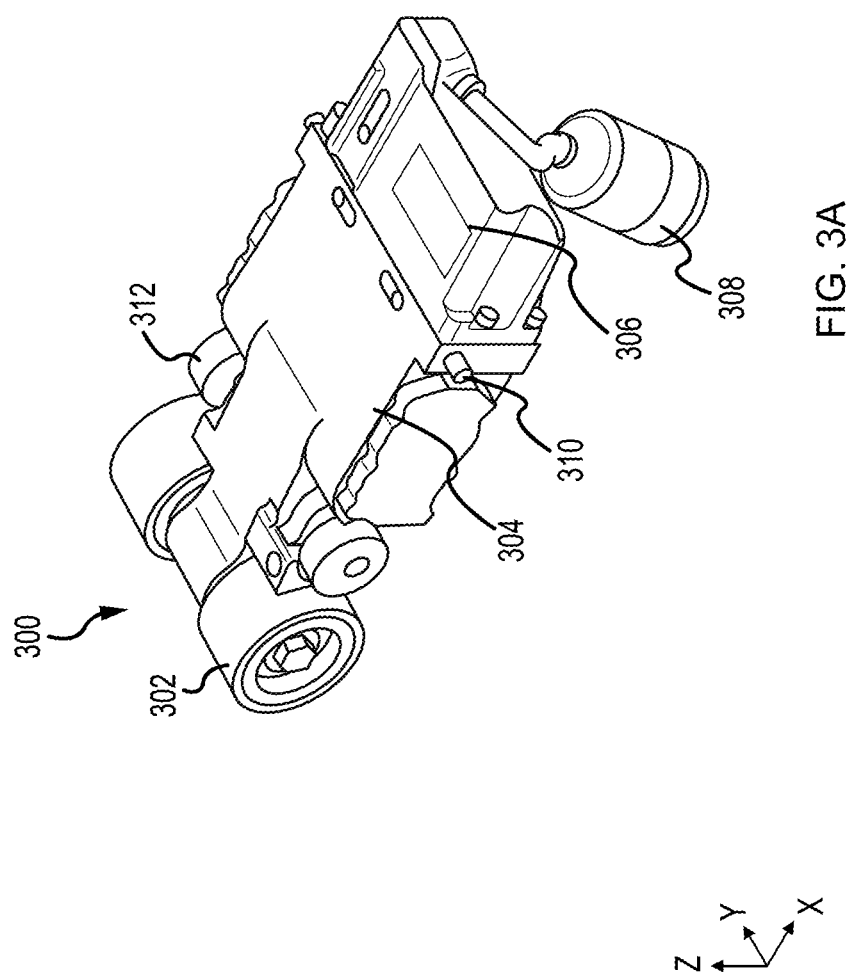
FIGS. 3A and 3B illustrate a power drive unit, in accordance with various embodiments.
Figure 3B:
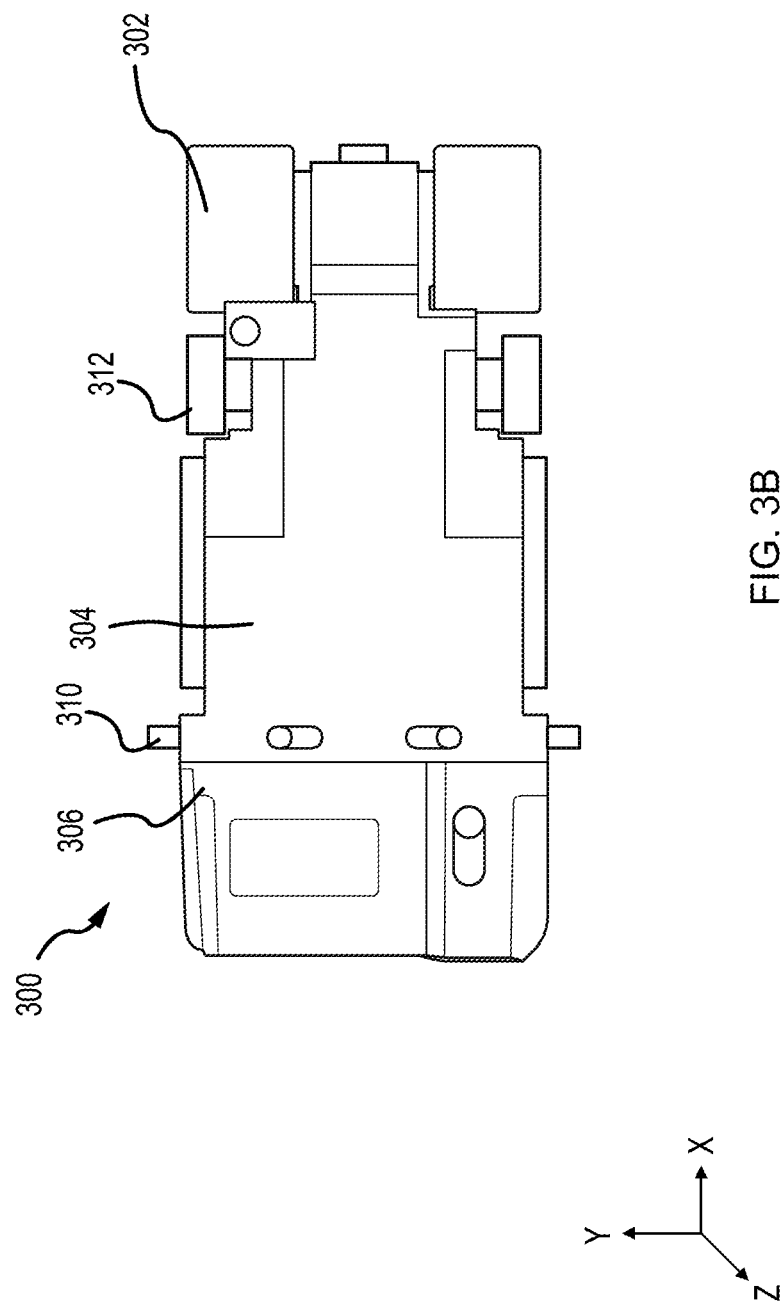

Referring to FIGS. 3A and 3B, in accordance with variance embodiments, a power drive unit (PDU) 300 is illustrated. PDU 300 includes one or more wheels 302, a motor housing 304, an electronics housing 306, a wire harness 308, a pin 310, and one or more cams 312. PDU 300 can be used in a cargo bay of an aircraft for moving one or more unit load device (ULD) relative to the cargo bay. A ULD can include any cargo unit to be stored in the cargo bay during flight.

The one or more wheels 302 cause movement of the ULD in a particular direction with the cargo bay. Motor housing 304 provides the mechanical power used by wheels 302 to move the ULD. Electronics housing 306 provides electrical power to motor housing 304 and controls motor housing 304. Wire harness 308 provides a connection to the aircraft power and controls for controlling PDU 300. PDU 300 rotates about pin 310 using cams 312 to raise and lower PDU 300.

The one or more wheels 302 of PDU 300 rotate, causing movement of the ULD in a particular direction. PDU 300 may be positioned adjacent to an entrance of the cargo bay, and in that regard, PDU 300 may be designed to move a ULD along the X axis and along the Y axis along a conveyor plane, such as conveyance surface 102 described above with respect to FIG. 1B. Stated differently, PDU 300 may be designed to move the ULD forward/aft and laterally relative to the aircraft. In order to accomplish both of these movements, PDU 300 can be controlled to lower itself below the conveyor plane and then to have an orthogonally oriented PDU raise itself above the conveyor plane. For example, PDU 300 may be raised above the conveyor plane to transport a ULD along the Y axis, such as from a door of a cargo bay into the cargo bay. After the ULD is in the cargo bay, PDU 300 can lower itself below the conveyor plane, while an adjacent PDU raises itself above the conveyor plane for transporting the ULD along the X axis.

The one or more cams 312 rotate, causing PDU 300 to raise itself above the conveyor plane or lower itself below the conveyer plane. In various embodiments, cams 312 engage a portion of a tray (e.g., tray 204) in which PDU 300 is located to raise and lower PDU 300. As illustrated in FIG. 3A, PDU 300 is in a lowered position. In response to cams 312 rotating while engaging the tray, PDU 300 raises itself above the conveyor plane by rotating about pin 310. In various embodiments, cams 312 may rotate about 120° to about 150°, and more specifically, about 130° to about 140° to raise PDU 300. In response to cams 312 rotating while engaging the tray, returning to the depicted position, PDU 300 lowers itself below the conveyor plane by rotating about pin 310. In various embodiments, cams 312 may rotate about 140° to about 170°, and more specifically, about 150° to about 160° to lower PDU 300.

Figure 4A:
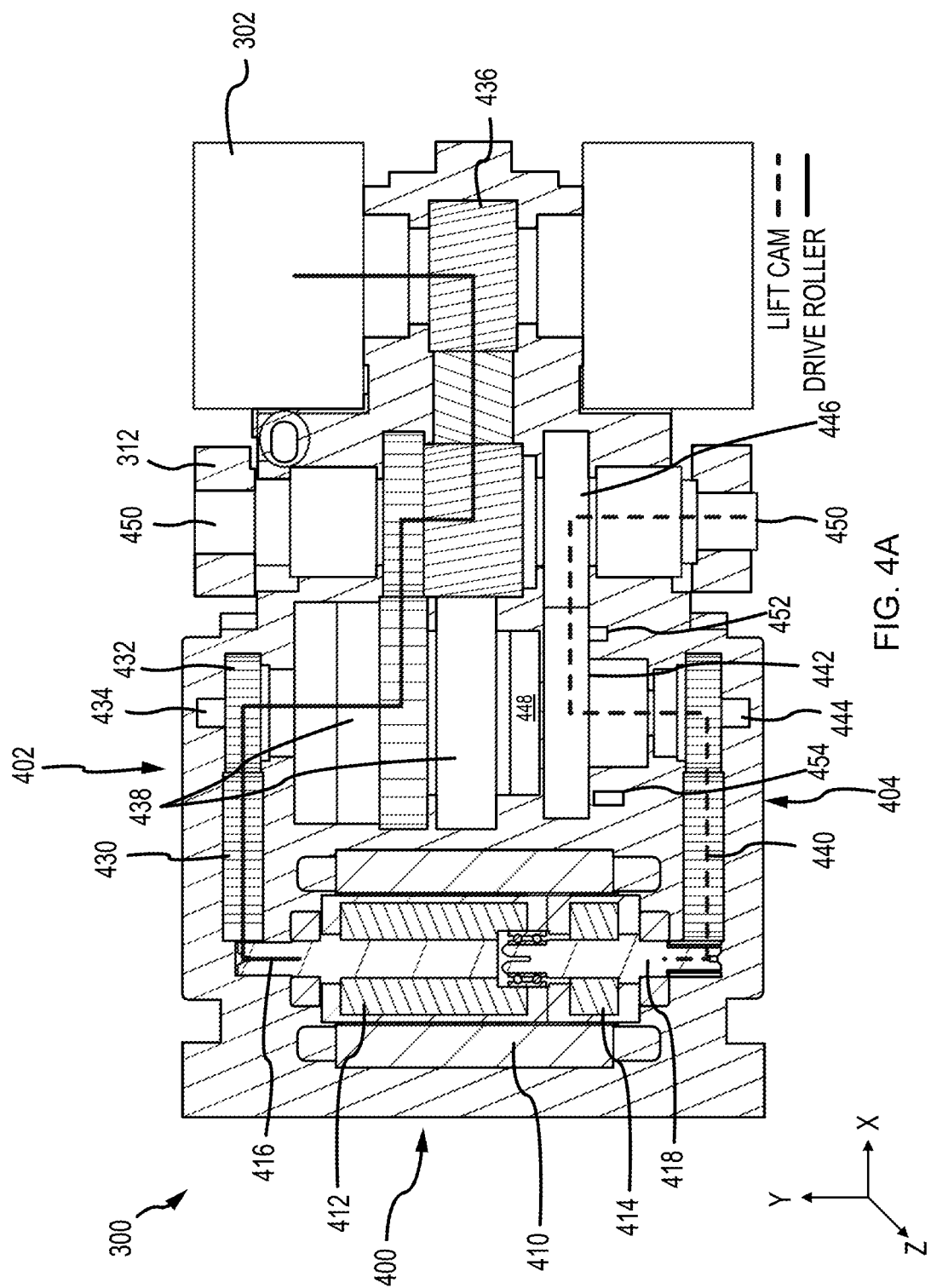
FIGS. 4A and 4B illustrate a power drive unit including a dual-rotor induction motor and an independent gear path for lift and drive, in accordance with various embodiments.
Figure 4B:
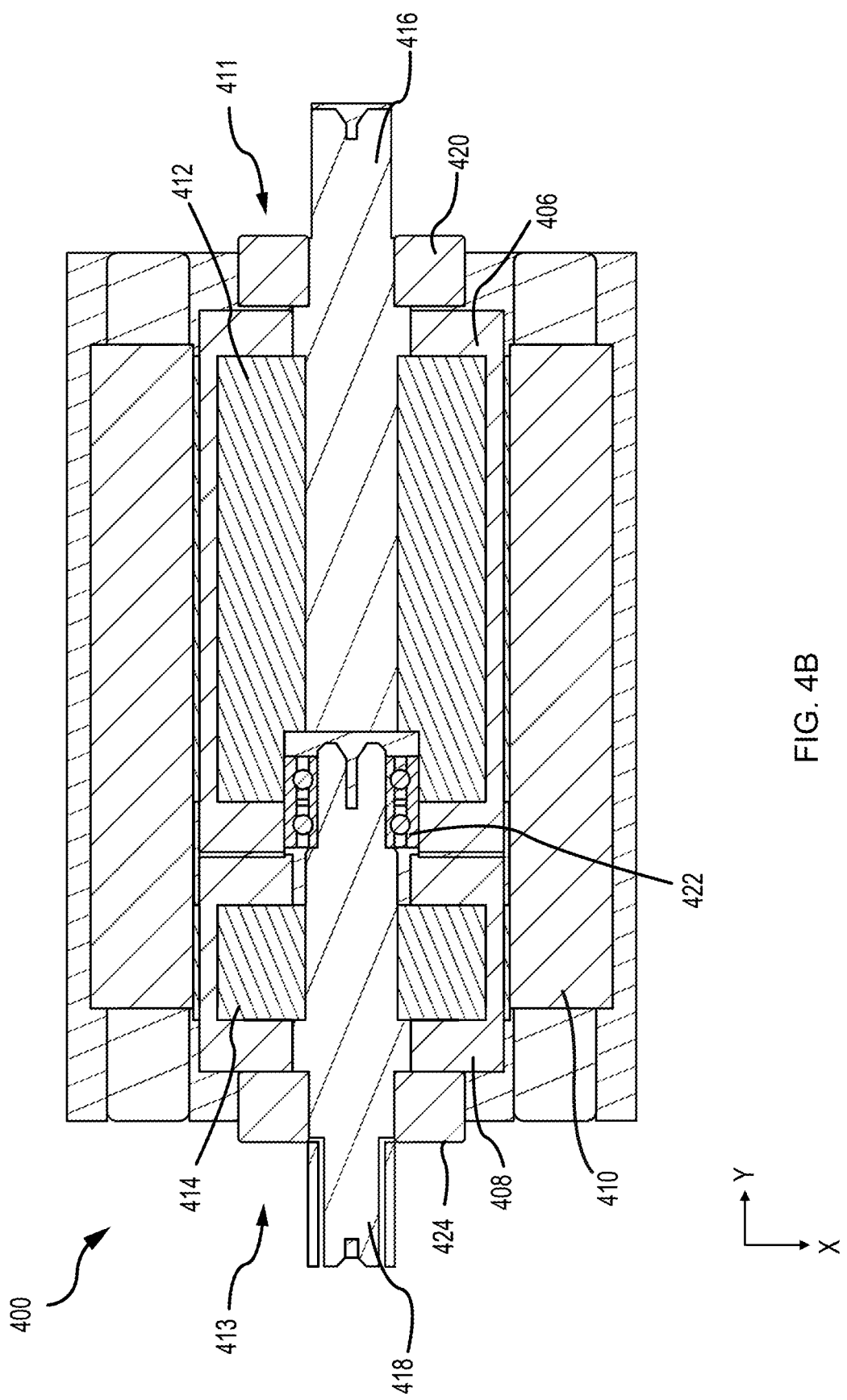

Referring now to FIGS. 4A and 4B, in accordance with various embodiments, PDU 400, and more specifically, the internal components of motor housing 304 are illustrated. PDU 400, and more specifically motor housing 304, includes a dual-rotor induction motor 400, one or more drive gears 402, and one or more lift gears 404.

Motor 400 may include a drive cast portion 406, a lift cast portion 408, a stator 410, a drive rotor 411, a lift rotor 413, a drive shaft 416, and a lift shaft 418. The drive rotor 411 includes drive rotor lamination 412, drive cast portion 406, and drive shaft 416. The lift rotor 413 includes lift rotor lamination 414, lift rotor case portion 408, and lift shaft 418. The motor housing 304 houses drive rotor 411 including drive rotor lamination 412 and drive shaft 416, with drive shaft 416 extending out one side of drive cast portion 406 (e.g., the y-direction as illustrated). The motor housing 304 further houses lift rotor 413 including lift cast portion 408, lift rotor lamination 414 and lift shaft 418, with lift shaft extending out from both sides of lift cast portion 408 (e.g., the negative y-direction and the y-direction as illustrated). Stator 410 and drive rotor 412 provide motive force to rotate drive shaft 416. Stator 410 and lift rotor 414 provide motive force to rotate lift shaft 418.

Motor 400 further includes a drive bearing 420, an inner bearing 422, and a lift bearing 424. Drive bearing 420 is located around drive shaft 416 and outside of and adjacent to drive cast portion 406. Inner bearing 422 is located around lift shaft 418 extending from lift cast portion 408 and within drive cast portion 406. Lift bearing is located around lift shaft 418 and outside of and adjacent to lift cast portion 408. This configuration allows lift shaft 418 to rotate independently from drive shaft 416.

Drive shaft 416 is configured to drive wheels 302 through the one or more drive gears 402. For example, as illustrated, drive shaft 416 is coupled to a first drive gear 430 and is configured to drive first drive gear 430. First drive gear 430 is configured to drive a second drive gear 432. Second drive gear 432 is coupled to and configured to rotate a shaft 434. As shaft 434 rotates, additional drive gears may be used to convert the drive from the second drive gear 432 to a third drive gear 436 that is coupled to and configured to rotate wheels 302. Shaft 434 may further be coupled to bearings 438. As illustrated, the solid line through the one or more drive gears 402 (including first drive gear 430, second drive gear 432, and third drive gear 436) represents the path of the drive force from motor 400 to wheels 302. The illustrated embodiment is for discussion purposes and is not intended to be limiting. Other configurations of drive gears within motor housing 304 are possible and the one or more drive gears 402 may be modified to suit the intended use for a given purpose.

Lift shaft 418 is configured to rotate cams 312 through the one or more lift gears 404. For example, as illustrated, lift shaft 418 is coupled to a first lift gear 440 and is configured to drive first lift gear 440. First lift gear 440 is configured to drive a second lift gear 442. Second lift gear 442 is configured to rotate a shaft 444. As shaft 444 rotates, additional drive gears may be used to convert the drive from the second lift gear 442 to a third lift gear 446 that is coupled to and configured to rotate cams 312, such as through a camshaft 450. Shaft 444 may further be coupled to bearings 448. Camshaft 450 may run through or around the one or more drive gears 402 without engaging the one or more drive gears 402, thereby maintaining separation between the one or more drive gears 402 and the one or more lift gears 404. As illustrated, the dotted line through the one or more lift gears 404 (including first lift gear 440, second lift gear 442, and third lift gear 446) represents the path of drive force from motor 400 to cams 312. The illustrated embodiment is for discussion purposes and is not intended to be limiting. Other configurations of drive gears within motor housing 304 are possible and the one or more lift gears 404 may be modified to suit the intended use for a given purpose.

The use of a dual-rotor induction motor, such as motor 400, reduces part count and design complexity by decoupling the drive force from the lift force. For example, a drag clutch, which is a consumable part, is not used to engage cams 312 while engaging wheels 302. As another example, decoupling the drive force from the lift force reduces or eliminates the use of a planetary gear and/or a differential gear train, resulting in an architecture with a fewer part count that is easier to assemble than a planetary gear and/or a differential gear train. As another example, two rotors (e.g., drive rotor 412 and lift rotor 414) within a single stator (e.g., stator 410) is an architecture with a fewer part count than using two separate actuators or motors to drive and lift.

When it is desirable for PDU 300 to raise above the conveyor plane (e.g., the z-direction), motor 400 can generate mechanical power within lift cast portion 408 that is transferred from lift shaft 418 and through the one or more lift gears 404, as described above. At the same time, motor 400 can generate mechanical power within the drive cast portion 406 that is transferred from drive shaft 416 and through the one or more drive gears 402 to rotate wheels 302, as described above. As previously noted, the lift and drive gears are independent from each other.

As the lift rotor 414 rotates lift shaft 418 in a forward direction, power is transferred through the one or more lift gears 404 to camshaft 450. As camshaft 450 rotates, cams 312 rotate, lifting PDU 300. During this process, a mechanical stop 452 is rotated and comes into contact with a stop catch 454, causing the rotation to stall. As illustrated, mechanical stop 452 is located on second lift gear 442. As second lift gear 442 rotates in the forward direction, mechanical stop 452 rotates around lift shaft 444 until coming into contact with stop catch 454 and cams 312 rotate lifting PDU 300 above the conveyer plane (e.g., the z-direction). Stop catch 454 may be coupled to motor housing 304. In various embodiments, stop catch 454 may be coupled to another structure or component within motor housing 304. Stop catch 454 contacts mechanical stop 452, thereby stopping rotation of second lift gear 442 and stalling lift rotor 414.

Drive rotor 412 and drive shaft 416 operate independently from lift rotor 414 and lift shaft 418 so that drive rotor 412 continues to operate, driving wheels 302 as described above, while lift rotor 414 is in the stalled state.

When it is desirable for PDU 300 to lower below the conveyor plane (e.g., negative z-direction), motor 400 can rotate in the reverse direction, causing lift rotor 414 to rotate in the reverse direction and thereby causing mechanical stop 452 to rotate away from stop catch 454. In the illustrated example, rotating lift rotor 414 in the reverse direction causes second lift gear 442 to rotate in the reverse direction. Second lift gear 442 rotates mechanical stop away from stop catch 454, rotating cams 312 to lower PDU 300. In various embodiments, PDU 300 may be returned to the lowered positing below the conveyor plane using a spring located between motor housing 304 and tray 204 may. The downward pull of the spring causes camshaft 312 to rotate and back drive the lift gear train, lower PDU 300.

As described above, motor 400 utilizes two rotors, a drive rotor 412 and a lift rotor 414. The drive rotor 412 is designed to be a continuously rotating induction machine while the lift rotor 414 is designed to be a constant stall motor. With this design, motor 400 may operate in four conditions. First, an initial condition where both drive rotor 412 and lift rotor 414 are at a standstill (e.g., not rotating). Second, both drive rotor 412 and lift rotor 414 are rotating (e.g., PDU 300 is raising or lowering). Third, initial contact of the ULD with wheels 302 while lift rotor 414 is stalled causing a potential stall condition for drive rotor 412. Fourth, drive rotor 412 is rotating and lift rotor 414 is stalled. Drive rotor 412 and lift rotor 414 are electrically coupled in series such that when lift rotor 414 is stalled (e.g., third and fourth conditions) it appears as a short to drive rotor 412. Drive rotor 412 and lift rotor 414 may be designed to account for the locked lift rotor 414 so that drive rotor 412 creates sufficient torque to generate the desired output characteristics.

For example, while drive rotor 412 and lift rotor 414 may have the same diameter (e.g., the x-direction), the length of each may vary. As illustrated, drive rotor 412 is longer in the y-direction than lift rotor 414. Since torque is proportional to length, a longer rotor results in more torque which is better for driving wheels 302 to move ULDs. Other parameters may be varied such as rotor inductions and rotor resistance which are properties of physical geometry (e.g., diameter and length) and material of the rotor. In various embodiments, drive rotor 412 and/or lift rotor 414 may include cast aluminum, steel, copper, or among others. In various embodiments, drive rotor 412 and/or lift rotor 414 may include slots. The slot count and slot geometry may be varied.

Figure 5:
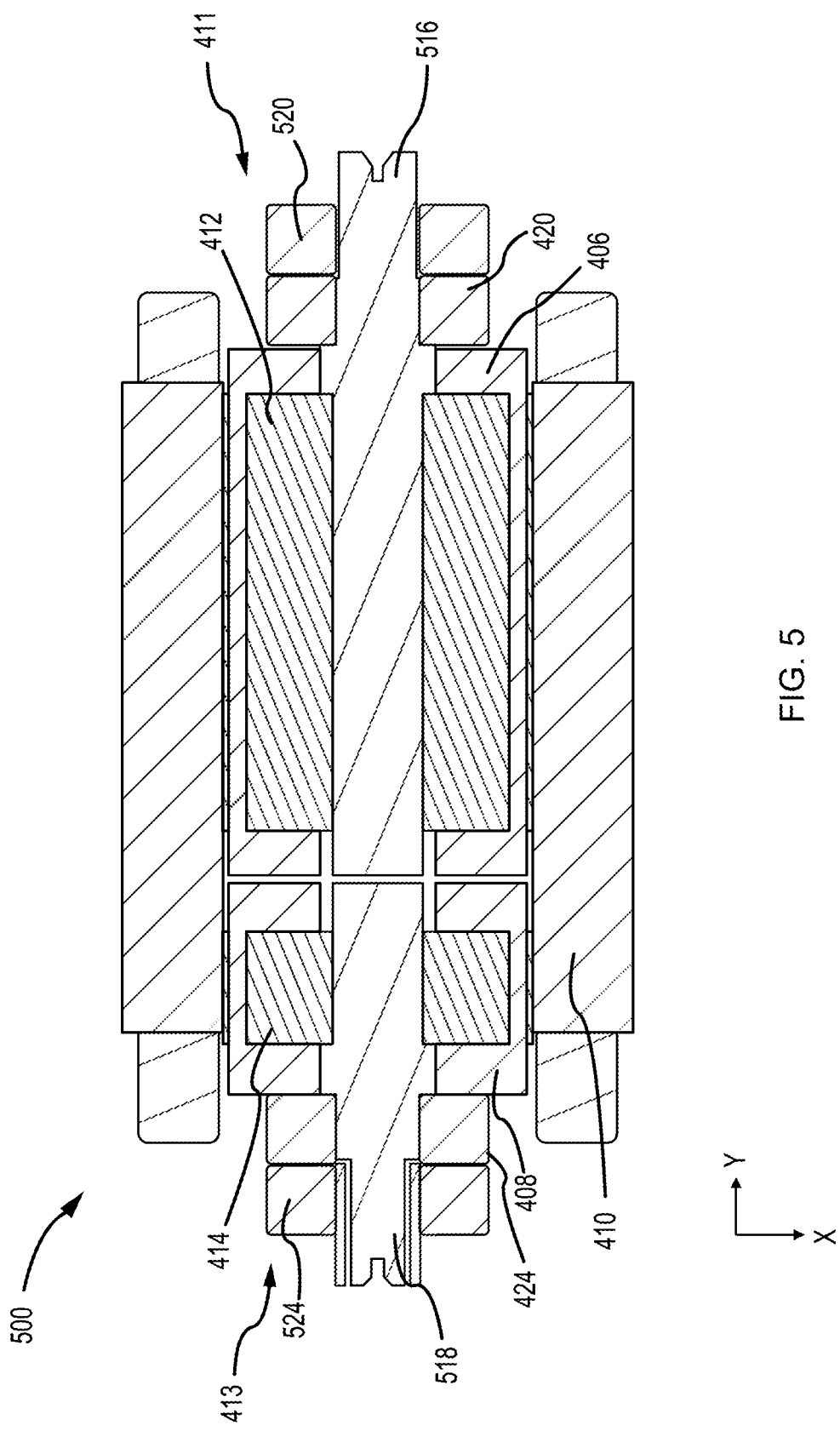
FIG. 5 illustrates a dual-rotor induction motor for use in a power drive unit, in accordance with various embodiments.

Referring now to FIG. 5, in accordance with various embodiments, a motor 500 is illustrated. Motor 500 includes similar components as those described above with respect to motor 400 with respect to FIG. 4B. For example, motor 500 includes a stator 410, a drive cast portion 406, a lift cast portion 408, a drive rotor 412, a lift rotor 414, a drive shaft 516, and a lift shaft 518. Accordingly, various features and components described above with respect motor 400 and FIG. 2 may not be repeated here.

Motor 500 further includes a second drive bearing 520 and a second lift bearing 524. Second drive bearing 520 is located adjacent drive bearing 420 along drive shaft 516 with drive bearing 420 being between second drive bearing 520 and drive cast portion 406. Drive bearing 420 and second drive bearing 520 provide support and stabilization for drive shaft 516 as drive shaft 516 rotates.

Lift shaft 518 extends out from lift cast portion 408 away from drive cast portion 406 (e.g., the negative y-direction) but does not extend into the drive cast portion 406 (e.g., the y-direction). Second lift bearing 524 is located adjacent lift bearing 424 along lift shaft 514 with lift bearing 424 being between second lift bearing 524 and lift cast portion 408. Lift bearing 424 and second lift bearing 524 provide support and stabilization for lift shaft 514 as lift shaft 514 rotates.

Figure 6:
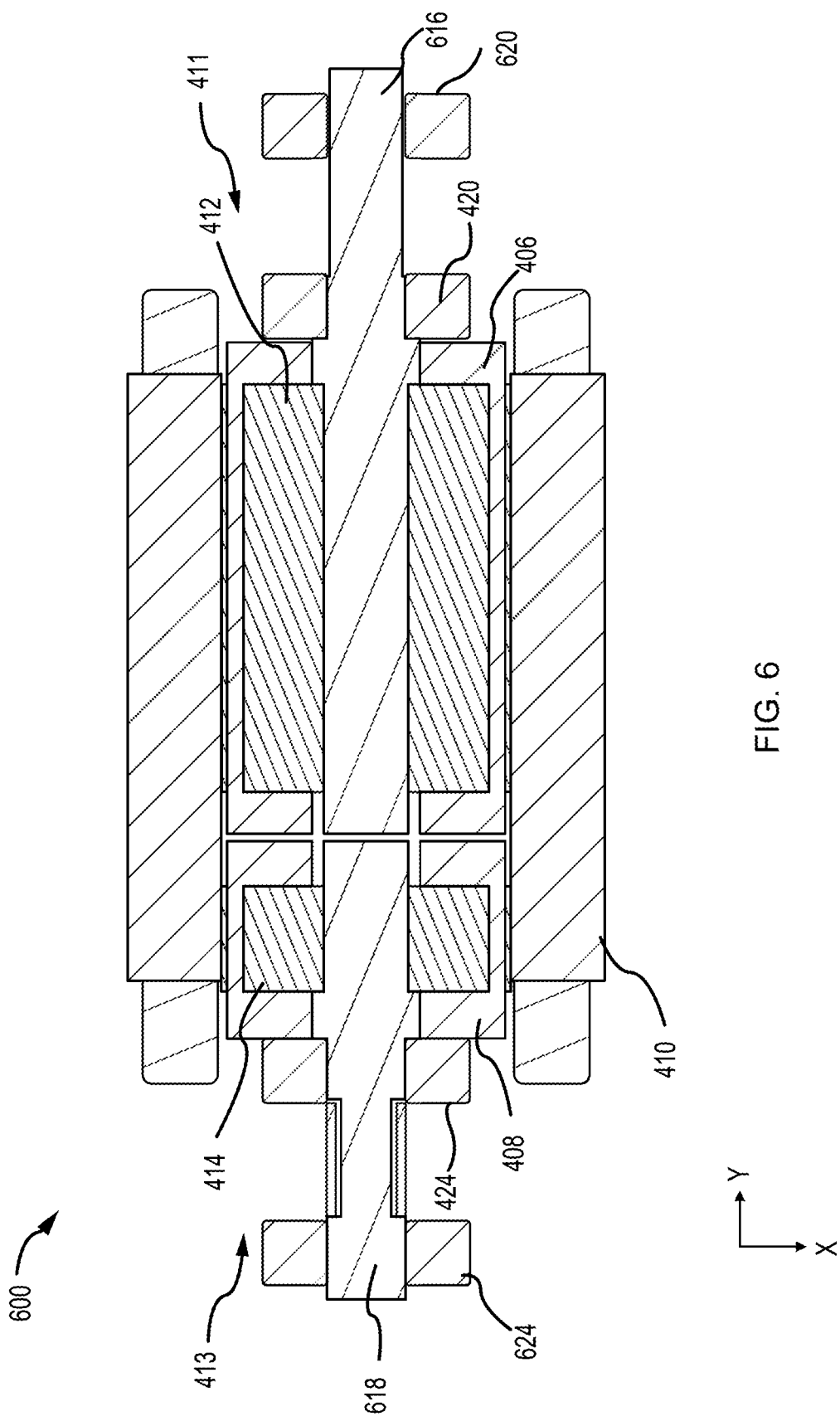
FIG. 6 illustrates a dual-rotor induction motor for use in a power drive unit, in accordance with various embodiments.

Referring now to FIG. 6, in accordance with various embodiments, a motor 600 is illustrated. Motor 600 includes similar components as those described above with respect to motor 400 with respect to FIG. 2. For example, motor 600 includes a stator 410, a drive cast portion 406, a lift cast portion 408, a drive rotor 412, a lift rotor 414, a drive shaft 616, and a lift shaft 618. As such, various features and components described above with respect motor 400 and FIG. 2 may not be repeated here.

Motor 600 further includes a second drive bearing 620 and a second lift bearing 624. Second drive bearing 620 is located along drive shaft 616 and spaced apart from drive bearing 420 along drive shaft 616 (e.g., the y-direction) with drive bearing 420 being between second drive bearing 620 and drive cast portion 406. Drive bearing 420 and second drive bearing 620 provide support and stabilization for drive shaft 616 as drive shaft 616 rotates. Drive shaft 616 between drive bearing 420 and second drive bearing 620 may be configured to drive the one or more drive gears 402.

Lift shaft 618 extends out from lift cast portion 408 away from drive cast portion 406 (e.g., the negative y-direction) but does not extend into the drive cast portion 406 (e.g., the y-direction). Second lift bearing 624 is located along lift shaft 618 and spaced apart from lift bearing 424 along lift shaft 618 (e.g., the negative y-direction) with lift bearing 424 being between second lift bearing 624 and lift cast portion 408. Lift bearing 424 and second lift bearing 624 provide support and stabilization for lift shaft 618 as lift shaft 618 rotates. Lift shaft 618 between lift bearing 424 and second lift bearing 624 may be configured to drive the one or more lift gears 404.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended to be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 312(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A power drive unit for moving cargo relative to a cargo bay of an aircraft, comprising:
    a lift cam coupled to a camshaft;
    a drive wheel coupled to a drive shaft;
    an induction motor having a first output shaft and a second output shaft, the first output shaft configured to drive the drive shaft and the second output shaft configured to drive the camshaft;
    a first gear directly coupled to the first output shaft and configured to drive the drive shaft; and
    a second gear directly coupled to the second output shaft and configured to drive the camshaft, the second gear being operably independent from the first gear.

2. The power drive unit of claim 1, the induction motor further comprising:
    a first rotor;
    a second rotor; and
    a stator disposed around the first rotor and the second rotor, wherein the first rotor is coupled to the first output shaft and the second rotor is coupled to the second output shaft.

3. The power drive unit of claim 2, wherein the first rotor has a first length and the second rotor has a second length, the second length being shorter than the first length.

4. The power drive unit of claim 2, the induction motor further comprising:
    the first rotor including a first cast portion having a first side and an opposing second side, the first cast portion including a first rotor lamination and a first portion of the first output shaft, a second portion of the first output shaft extending out of the second side of the first cast portion;
    the second rotor including a second cast portion having a first side and an opposing second side, the second side of the second cast portion being adjacent the first side of the first cast portion, the second cast portion including a second rotor lamination and a first portion of the second output shaft, a second portion of the second output shaft extending out of the first side of the second cast portion;
    a first bearing disposed around the second portion of the first output shaft; and a second bearing disposed around the second portion of the second output shaft.

5. The power drive unit of claim 4, the induction motor further comprising:
a third bearing disposed around a third portion of the second output shaft, the third portion of the second output shaft extending out of the second side of the second cast portion and into the first side of the first cast portion, the third bearing being within the first cast portion and configured to allow the second output shaft and the first output shaft to rotate independently of each other.

6. The power drive unit of claim 4, the induction motor further comprising:
a third bearing disposed around the second portion of the first output shaft and adjacent the first bearing, the first bearing being disposed between the third bearing and the first cast portion; and
a fourth bearing disposed around the second portion of the second output shaft and adjacent the second bearing, the second bearing being disposed between the fourth bearing and the second cast portion.

7. An aircraft cargo system, comprising:
a cargo bay having a conveyer plane; and
a power drive unit for moving cargo configured to raise and lower with respect to the conveyer plane, the power drive unit including:
a camshaft;
a drive shaft;
an induction motor having a first output shaft and a second output shaft, the first output shaft configured to drive the drive shaft and the second output shaft configured to drive the camshaft;
a first gear directly coupled to the first output shaft and configured to drive the drive shaft; and
a second gear directly coupled to the second output shaft and configured to drive the camshaft, the second gear being independent of the first gear.

8. The aircraft cargo system of claim 7, the induction motor further comprising:
a first rotor electrically coupled to the first output shaft;
a second rotor electrically coupled to the second output shaft; and
a stator disposed around the first rotor and the second rotor and electrically coupled to the first rotor and the second rotor.

9. The aircraft cargo system of claim 8, wherein the first rotor has a first length and the second rotor has a second length, the second length being shorter than the first length.

10. The aircraft cargo system of claim 7, the power drive unit further comprising:

a wheel configured to move the cargo when the power drive unit is in a raised position, the wheel being coupled to the drive shaft and operable independent of the camshaft; and
a cam coupled to the camshaft and configured to raise and lower the power drive unit.

11. The aircraft cargo system of claim 8, wherein the first rotor further comprises:
a first cast portion, wherein a first portion the first output shaft is disposed inside the first cast portion and a second portion of the first output shaft is disposed outside of the first cast portion.

12. The aircraft cargo system of claim 11, wherein the second rotor further comprises:
a second cast portion, the second cast portion being laterally adjacent the first cast portion, wherein a first portion of the second output shaft is disposed within the second rotor inside the second cast portion and a second portion of the second output shaft is disposed outside of the second cast portion.

13. The aircraft cargo system of claim 12, wherein a third portion of the second output shaft is disposed outside of the second cast portion and inside of the first cast portion.

14. A power drive unit, comprising:
a first gear assembly configured to drive a wheel;
a second gear assembly configured to drive a camshaft;
an induction motor including:
a first rotor including a first rotor cast portion coupled to a first output shaft, the first output shaft directly coupled to the first gear assembly;
a second rotor including a second rotor cast portion coupled to a second output shaft, the second output shaft directly coupled to the second gear assembly; and
a stator, the stator being disposed around the first rotor cast portion and the second rotor cast portion.

15. The power drive unit of claim 14, further comprising:
a stop catch; and
a stop mechanism coupled to the second gear assembly and configured to contact the stop catch to stop the second gear assembly from rotating.

16. The power drive unit of claim 15, wherein the second rotor is configured to stall when the stop mechanism contacts the stop catch.

17. The power drive unit of claim 16, wherein the first rotor is configured to rotate while the second rotor is stalled.

18. The power drive unit of claim 14, wherein the first gear assembly operates independently of the second gear assembly.

* * * * *